United States Patent [19]

McKennon et al.

[11] Patent Number: 5,228,808

[45] Date of Patent: Jul. 20, 1993

[54] METHOD FOR PREVENTING THE ADVERSE EFFECTS OF SWELL IN SULFATE BEARING, EXPANSIVE CLAY SOILS

[75] Inventors: J. T. McKennon, Dallas; Norman L. Hains, Arlington; David C. Hoffman, Fort Worth, all of Tex.

[73] Assignee: Chemical Lime Company, Fort Worth, Tex.

[21] Appl. No.: 800,630

[22] Filed: Nov. 27, 1991

[51] Int. Cl.$^5$ .............................................. C09K 17/00
[52] U.S. Cl. ...................................... 405/263; 106/706; 106/793; 106/796; 106/900; 405/266
[58] Field of Search ................ 405/263, 266; 106/633, 106/681, 706, 718, 721, 793, 796, 812, 900

[56] References Cited

U.S. PATENT DOCUMENTS

| | | | |
|---|---|---|---|
| 2,916,853 | 12/1959 | Latourette et al. | |
| 3,635,742 | 1/1972 | Fujimasu. | |
| 3,741,308 | 6/1973 | Veley. | |
| 3,854,968 | 12/1974 | Minnick et al. | 106/710 |
| 3,861,930 | 1/1975 | Lin | 106/784 X |
| 4,188,231 | 2/1980 | Valore | 106/700 |
| 4,233,015 | 11/1980 | Teague et al. | 405/263 |
| 4,266,980 | 5/1981 | Chudo et al. | 106/715 X |
| 4,329,090 | 5/1982 | Teague et al. | 405/263 |
| 4,461,644 | 7/1984 | Childs et al. | 106/606 |
| 4,465,518 | 8/1984 | Miyoshi et al. | 106/715 |
| 4,496,267 | 1/1985 | Gnaedinger | 106/697 X |
| 5,122,012 | 6/1992 | Walker | 405/263 |

FOREIGN PATENT DOCUMENTS 56-143288 11/1981 Japan.
61-87776 5/1986 Japan.
61-91283 5/1986 Japan.

*Primary Examiner*—Dennis L. Taylor
*Assistant Examiner*—John Ricci
*Attorney, Agent, or Firm*—Charles D. Gunter, Jr.

[57] ABSTRACT

A method is shown for stabilizing sulfate bearing soils in which a silica compound is incorporated into the soils with the soils being further stabilized by the application of lime. The silica compound can be either an amorphous, flume silica, a crystalline silica, a silica gel, sodium silicate, potassium silicate or combination thereof. The silica compound and lime can be incorporated into the soils in a single step.

9 Claims, No Drawings

METHOD FOR PREVENTING THE ADVERSE EFFECTS OF SWELL IN SULFATE BEARING, EXPANSIVE CLAY SOILS

BACKGROUND OF THE INVENTION

1. Field of the Invention

The present invention relates generally to soil stabilization methods and to compositions for use therein and or specifically, to a method for improving the characteristics of problematic, sulfate rich, highly expansive clay soils by treating with silica compounds in conjunction with lime stabilization.

2. Description of the Prior Art

For many years, calcined lime in the form of hydrated lime, $Ca(OH)_2$ or quicklime, $CaO$, has been widely used as an additive to (1) stabilize highly plastic clay soils; (2) to prevent the shrinking and swelling characteristics of such soils and to (3) increase the load carrying ability of the treated soil. This system of treating clay bearing soils has been highly successful and economical, especially in the cases of highway and airport construction, and has been specified by most of the highway and transportation departments in the contiguous United States. In the past, subgrades have been improved as building sites, streets, runways, railroads, for remedial stabilization of existing structures, slope stabilization and for landfill stabilization, to list a few typical examples. Areas void in good, low plastic, construction materials for building highways, airports, parking lots, building foundations and the like have been fortunate to have expansive clays, such as montmorillonite or kaolinite type clay soils, which can be treated with lime to provide base and sub-base soil of low plasticity and low water susceptibility. Lime and lime slurries have been worked into the top layers of such soils; for example, 6 to 36 inches in depth to improve and stabilize such soils or subgrades. Chemical soil stabilization by injection of lime slurry at predetermined depths below the soil surface is also known using freshly slaked quicklime or hydrated lime slurries.

Such lime-treated, base-course layers build strength over time due to pozzolanic soil reactions. Strength development to over 2000 p.s.i. has been documented. These pozzolanic reactions, resulting from the combination of silica and free alumina provided by the clay in a high pH environment, and lime which provides the calcium and high pH driving force, produce calcium silica hydrates (CSH) and calcium aluminum hydrates (CAH)—the major strength-producing components.

In the late 1970's and 1980's, infrequent reports of a "heaving" phenomenon in lime treated soils were reported in Nevada and North Central Texas. This heaving manifested itself as a rapid vertical and horizontal movement in the lime treated layer under certain specific environmental conditions. In some notable documented instances in Nevada, the distressed concrete surface topping exhibited long lateral cracks, and in some cases the surface was seen to move laterally some 12 inches and vertically up to 6 inches. The result was destruction of the pavement requiring removal and replacement. The same phenomenon has been observed in two areas in Texas. The expansion of the soil was noted to take place in instances of excessive water volumes entering the treated soil due to some unusual circumstance, for instance, natural water drainage from a hill onto a road bed.

It is now theorized that the heave problem was caused by high concentrations of water soluble sulfates native to the soil in very specific areas, in the form of gypsum ($CaSO_4.2H_2O$) or sodium sulfate, ($NaSO_4$), which formed highly expansive ettringite crystals in the presence of lime and excess water. Formation of ettringite, $Ca_6[Al(OH)_6]_2(SO_4)_3.26H_2O$; and thaumasite, $Ca6[Si(OH)_6]_2(SO_4)(CO_3)_2.26H_2O$, (under certain temperature change conditions), caused massive displacement of pavement due to the creation of forces of more than 35,000 lbs per square inch. A large body of published documentation exists concerning the ettringite formation system in cases of sulfate attack in concrete.

Thus, despite the advances achieved in lime-soil stabilization techniques, a need continues to exist for a method for improving the characteristics of soils or aggregate soil mixtures, particularly those soils which have a high sulfate content making them subject to uncontrolled, undesirable swell or expansion.

A need exists for such a method which is simple and economical in practice and which is compatible with existing lime-soil stabilization techniques.

SUMMARY OF THE INVENTION

In the method of the invention, sulfate-bearing soils are stabilized by incorporating into the soils an effective amount of a silica compound combined with the application of lime to the soils. Preferably, the silica compound and the lime are incorporated into the soils in a single step. The silica compound can conveniently be selected from the group consisting of amorphous silica, crystalline silica or silica gel (sodium silicate or potassium silicate) and combinations thereof. The lime which is applied to the soils is preferably provided in the form of calcium hydroxide or quicklime convertible to calcium hydroxide in situ by the addition of copious amounts of water.

The preferred method is particularly suited for reducing the swelling potential of soluble sulfates present in clay bearing soils of the type having free alumina present therein. Such sulfates and free alumina tend to combine in a chemical reaction to form highly expansive ettringite crystals in the presence of lime and excess water, where such free alumina and silica normally produce calcium silica hydrates and calcium aluminum hydrates in the presence of lime and nominal water content. In the preferred method, both lime and a silica compound or compounds are incorporated into the soil, the silica compound or compounds being present in an amount effective to rapidly chemically bond with the free calcium in the lime and hydrates of alumina present in the clay bearing soils to thereby rob the ettringite reaction of the free calcium and hydroxyls needed to go to completion. This chemical chelation type reaction reduces the tendency of the soil to form ettringite compounds of the type which would result in undesired soil displacement. The silicon dioxide ($SiO_2$) is preferably applied to the soils at an application rate of about 0.2 to 6% by weight based on the dry weight of one square yard at design depth of the clay bearing soil being treated. The silica is solubilized in the high pH environment provided by lime. Potassium hydroxide can also be added to the mixture of soil, lime, and silica compounds in order to increase the pH of the soils and cause the free alumina in the soils to be released more rapidly in the presence of lime and the silica compound. This enhancement speeds up the favorable pozzolanic soil reactions, minimizing the risk of ettringite formation.

Additional objects, features and advantages will be apparent in the written description which follows.

DETAILED DESCRIPTION OF THE INVENTION

In spite of advances in lime (calcium hydroxide) soil stabilization techniques, it has been found that soluble sulfates present in certain sulfate bearing soils, react with calcium hydroxide and free alumina to form the water sensitive mineral ettringite $Ca_6[Al(OH)_6]_2 \cdot (SO_4)_3 \cdot 26H_2O$. Expansion due to the growth of ettringite in lime stabilized sulfate soils often produces severe problems, for instance in the construction and performance of pavement foundation systems. The amount and type of sulfates present in the soil, namely sodium sulfate and/or calcium sulfate, and the amount and type of clay material present are properties which play key roles in the post stabilization expansion developed over time in lime-treated sulfate soils. The formation of ettringite is also known to be responsible for the deterioration of concrete by sulfate attack.

Because the quantity of sulfates present generally influences the extent to which ettringite will form, it is important to evaluate sulfate content in soils intended for construction purposes. Simply stated, the greater the content of water soluble sulfates in the soil, the greater the potential for growth of ettringite. The soluble sulfate level of the prospective clay for lime treatment can be determined by standardized laboratory testing. For instance, the soluble sulfate level can be measured using 1 part water to 1 part clay soil for water extraction. The sulfate is then measured by precipitation using barium hydroxide or barium chloride to acquire insoluble barium sulfate. The use of higher water ratios will render higher sulfate concentration results due to the solubility of gypsum. Sulfate levels as low as 500 ppm have been found to be problematical at a 1 to 1 mix of soil and water respectively. The same soil at one part soil to 10 parts water could render a sulfate level as 5000 ppm.

It is also advisable before carrying out the method steps of the present invention to determine the swell potential of the neat soil control sample, both due to water retention and due to potential ettringite development. A knowledge of the proper amount of lime to be added to stabilize the clay and knowledge of the ultimate pH level of the soil after liming should also be determined. If sulfates are present, it is also advisable to determine if potassium hydroxide is required to provide optimum pH during the critical stages of curing and to determine the ultimate stabilized soil strength and cure rate desired to successfully prevent or minimize risk of the formation of ettringite and thaumasite which severely stress the lime treated clay soils. This information can be routinely developed by geotechnical laboratory analysis prior to specifying job requirements and bidding on construction jobs and will be familiar to those skilled in the art.

Prior to the present invention, the remedy for the infrequent "heaving" phenomenon in lime treated soils was generally to either remove and replace the affected concrete and soil or to plow up the affected soil, retreat with lime and recompact the soil, all at some expense. Although the later treatment has, for the most part, been successful, there was no assurance that this treatment would not revert to ettringite formation at a later date when new or regenerating sources of water born sulfates could again enter and attack the treated soil matrix before pozzolanic reactions could take place. In the co-pending application, Ser. No. 07/650,748, entitled *Method for Improving the Characteristics of sulfate Bearing Soils,* filed Feb. 5, 1991, and assigned to the assignee of the present invention, a method for preventing the previously described problem is described. This method involves tying up and precipitating all water soluble sulfates in non-soluble barium salt compounds. The present invention, while directed toward the same problem, involves the different technique of robbing the ettringite reaction of the calcium and hydroxyls (i.e., free OH groups) needed to go to completion.

Recent research indicates that ettringite does not form after pozzolanic reactions have developed and thereby increased the strength of the lime treated soil matrix. It is known that the alumina (aluminum oxide, $Al_2O_3$) necessary for ettringite formation is no longer solubilized and sufficiently available after the pozzolanic calcium aluminum hydrates (CAH) have formed in making cementitious components and pH has been lowered below 11.

In the present invention, the formation of ettringite is prevented or diminished by promoting the calcium silica hydrate portion of the CSH/CAH cementitious reactions. This is accomplished by the addition of a silica compound to the clay bearing soils in question, in conjunction with a lime stabilization treatment. The silica compound is preferably a silica (silicon dioxide, $SiO_2$) selected from the group consisting of amorphous silica, silica "flume", crystalline silica, and silica gel. A preferred powdered silica is amorphous silica formed in burning rice hulls at controlled low temperatures. A typical commercially available product has an overall analysis of about 60% by weight silicon dioxide, about 35% by weight carbon, about 2% by weight trace metal contents and approximately 0.5% by weight moisture. Most silica containing compounds can also be utilized with some degree of effectiveness, as long as pozzolanic formation is not impeded, such as with some organic compounds. For instance, the silica compound can be crystalline silica in the form of ground or floured sand (preferably 100 mesh or less). Unprocessed sand is not sufficiently soluble to be effective for this invention.

The method of the invention is utilized to reduce or negate the swelling action of soluble sulfates present in clay bearing soils of the type having free alumina present therein, where such sulfates and free alumina tend to combine in a chemical reaction to form highly expansive ettringite crystals in the presence of lime and excess water and where such free alumina and silica found in the clay bearing soils normally produce calcium silica hydrates and calcium aluminum hydrates in the presence of lime. In the present method, the soils have incorporated therein both lime and a silica compound, the silica compound being present in an amount effective to accelerate pozzolanic reactions and to chemically bond with the free alumina present in the clay bearing soils to thereby rob the ettringite reaction of the free alumina, calcium and hydroxyls (e.g. free OH groups) needed to go to completion, thereby decreasing the potential of the soil to form ettringite. The soils are further stabilized by the simultaneous application of lime to the soils.

The effectiveness of the present treatment method is affected by a number of factors to be discussed. Sodium sulfate and calcium sulfate (gypsum) have different solubilities but the form of sulfates present in the soil plays an active role in the manner and timing of ettringite formation. Gypsum is approximately 100 times less soluble than other sulfate minerals normally found in the soils. Calcium and sodium sulfate commonly form evaporite minerals in arid to semiarid regions, due to little or no leaching, crystalizing when their concentrations exceed their solubility limits. Gypsum is the most common sulfate mineral found in soils due to its relatively low solubility. Therefore, gypsum requires more water to solubilize than does sodium sulfate. The source and amount of free water available to gypsum laden soils is significant in forming ettringite.

The percentage and type of clay minerals present in a soil generally dictates the amount of lime required to stabilize the soil. Soils with a high clay content or an initial high plasticity index (PI) and swell, require greater amounts of lime to effectively reduce the plasticity, eliminate the swell, and stabilize the soil. However, the addition of lime to a sulfate bearing soil provides calcium which reacts with the soluble sulfates, which may react with aluminum to form ettringite.

The type or types of clay present are also believed to be major factors in determining the strength and swell potential in lime stabilization. Smectites are three layered clays which are highly expansive. Thus a soil containing large amounts of smectite will require more lime to become stabilized. However, the two layered structure of kaolinite may allow it to be a greater source of free alumina needed for the formation of ettringite in sulfate bearing soils. Montmorillonite is also a highly expansive clay which can be treated according to the method of the present invention.

The preferred application rate of the silica compound as a percentage of the clay soil being treated is in the range from about 0.2 to 6% by weight, preferably from about 0.3 to 3.0% by weight, based on the weight of one square yard at design depth of the clay bearing soils being treated and is most preferably about 0.5% by weight. At a soil weight of 2,700 pounds per cubic yard, a square yard of lime treated subgrade 6 inches deep would require approximately 1.4 to 13.5 pounds of amorphous or powdered crystalline silica for successful prevention of sulfate induced heaving in a soil having 0.05% sulfates. Since dry silica can be mixed with and applied with the lime component, including the slurry form during the stabilization treatment, the extra cost of the present method involving silica addition is largely limited to the cost of the silica. These economic factors make the method of the invention most efficient and economical as a remedial process.

In practicing the method of the invention, it will be understood that the silica compound can be applied to the soils by combining the silica compound with a slurry of lime or combining the dry compound with dry lime, at the time of lime production.

The tests which follow were conducted to determine if reactions that form ettringite could be minimized in sulfate bearing soils by treating the soils with silica compounds in order to chemically bond with the free alumina present in the clay bearing soils to thereby limit the free alumina available for subsequent reaction with soluble sulfates and lime in the soils. The soils included in the tests which follow were selected because of their high sulfate content and expansive nature in problematical Texas and Colorado clays. The lime used in all tests was a calcium hydroxide, $Ca(OH)_2$, obtained through commercial lime producers. TESTING PROGRAM: Soils from a Denver Airport site were received in two shipments, in March and April, 1991. The testing sequence began with initial water content, natural pH and soluble sulfates testing. These materials were prepared for and tested for their natural Atterberg limits, their pH behavior as lime was added and their Atterberg limits after lime treatment. After a possible optimum amount of lime was determined, compaction tests were performed on the natural and lime treated soils. Final preliminary testing was complete when the mix design testing for optimum lime content for strength gain was finished. Based on the preliminary test results, a program of swell testing was designed to determine optimal treatments of the types described above. Table 1 which follows details the basic properties found for the Denver soils and Table 2 describes the treatments applied to Denver soils and swell test results obtained during this study. The swell test utilized has recently been developed and proven effective in simulating the heave to be expected in the field. The procedure utilized was as follows:

SWELL TEST PREPARATION

1. The soil sample is broken down so as to not break grains to the desired field pulverization specification —100% smaller than 1" in size and at least 60% smaller than the number 4 U.S. series sieve. The sample is further mixed thoroughly to provide as homogeneous a material as possible.

2. The sample is tested to determine the required percent lime by dry weight which is necessary to:
   a. Maximize the pH of the soil. (Minus # 40 U.S. Serial Sieve)
   b. Minimize the soil's Plastic Index. (Minus # 40 Sieve)
   c. Maximize the stabilized soil's strength using an unconfined compression test and 28 days of moist curing.
   d. Determine the compaction characteristics of treated soil, using standard Proctor compaction effort (ASTM D 698).

SWELL TESTING

1. A representative portion of the sample is taken which is large enough to allow the desired number of test specimens to be made.

2. To this sample is added to correct percent lime, water and other additives, by dry weight, for the test being done. The water content is slightly above the optimum for compaction.

3. This treated sample is allowed to mellow overnight, at least 24 hours, sealed so as not to lose moisture.

4. A specimen is compacted, cylindrical in shape, which is 6 inches in diameter and 4.5 inches high. The compactive energy used is equivalent to standard Proctor (ASTM 698).

5. The specimen is weighed and measured for height and circumference, and its water content is confirmed using soil trimmings.

6. The specimen is placed on a porous stone and a geotextile water-wicking fabric is placed around the specimen's perimeter, to full height.

7. Half of a six inch diameter triaxial membrane is placed around the specimen and folded in on the top of the specimen, which is then covered with plastic wrap to seal its top.

8. The specimen, with porous stone, etc. is then placed into a stainless steel bowl and the assemblage is placed into an oven set at 120° F.

9. After 48 hours in the oven, water is added to the bowl to such a level so that the porous stone is completely below water level.

10. The assemblage is kept in the oven until a total of seven days have passed, after which it is kept in the laboratory at ambient temperature of approximately 70° F.

11. Once water is applied to the specimen in the swell test it is maintained at the level described in 9 above.

12. The height and circumference of the specimen, with geotextile, membrane and plastic wrap, are measured before the test begins and each day of the test, except for Saturdays and Sundays.

13. The changes in height and diameter are related to the original specimen values, before placement of the geotextile, etc., and the percents increase are calculated.

14. If a double application of stabilizer(s) is to be done, the specimen is removed from the test after the prescribed delay, broken down to field specification pulverization, the second treatment is applied without mellowing time, the specimen is recompacted, the specimen is measured and weighed again, and it is placed back into the test setup. The swell test is then continued with the new height and diameter as bases for calculating percents of change to dimensions.

15. The test is terminated when at least 30 days have elapsed or the maximum swell has been determined with no further increase of dimensions for a sufficient length of time, such as two weeks.

16. The specimen is removed from the assemblage after the test, measured and weighed, and its water content is determined.

TABLE 1

| Natural Properties of Denver Airport Soils (Nine Samples of About 40 to 50 Pounds) | | |
| --- | --- | --- |
| Sulfates (ppm) | 1:1* | 1:10** |
| Low | 206 | 951 |
| High | 2474 | 5987 |
| Mean | 905 | 2775 |

| Atterberg Limits | LL | PL | PI | LS |
| --- | --- | --- | --- | --- |
| Low | 60.9 | 21.7 | 37.1 | 22.8 |
| High | 83.5 | 36.4 | 48.8 | 33.5 |

TABLE 1-continued

| Natural Properties of Denver Airport Soils (Nine Samples of About 40 to 50 Pounds) | | | | |
| --- | --- | --- | --- | --- |
| Mean | 68.9 | 27.2 | 41.7 | 28.1 |
| With 6% Lime | 54.4 | 37.8 | 16.6 | 7.1 |

*1 Part Soil:1 Part Water (Mixture)
**1 Part Soil:10 Parts Water (Mixture)

where.

"LL" is the Liquid Limit, or the moisture content (%) of the soil material at the upper limit of the plastic range (between the liquid and plastic states).

"PL" is the Plastic Limit, or the moisture content (%) of the soil material at the lower limit of the plastic range (between the plastic and semi solid states).

"PI" is the numerical difference between "LL" and "PL" and is called Plasticity Index (PI=LL-PL).

"LS" is the Linear Shrinkage (%) of a length of soil at Plastic Limit air dried to constant weight (percent loss of length).

Ref: AASHTO, T-89, T-90

TABLE 2

| Run | Treatment | Duration | Vert. Max. % | Days | No. | Aver. since | Hor. Max. % | Days | No. | Aver. since |
| --- | --- | --- | --- | --- | --- | --- | --- | --- | --- | --- |
| 1 | Natural | 47 | 9.96 | 22 | 17 | 9.35 | 7.77 | 12 | 25 | 7.50 |
| 2 | 6 L + 2 K | 47 | 2.76 | 21 | 18 | 1.93 | 3.59 | 15 | 22 | 3.14 |
| 3 | 8 L + 2 K | 47 | 6.22 | 34 | 9 | 5.29 | 3.19 | 6 | 29 | 2.84 |
| 4 | 6 L | 47 | 6.93 | 34 | 9 | 6.48 | 3.19 | 12 | 25 | 3.01 |
| 5 | 8 L | 47 | 8.80 | 41 | 4 | 8.31 | 3.59 | 12 | 25 | 3.28 |
| 6 | 10 L | 47 | 9.33 | 34 | 9 | 8.29 | 3.79 | 30 | 11 | 3.59 |
| 7 | 5 L + 0.5 S | 39 | 0.27 | 19 | 14 | −0.11 | 0.60 | 8 | 21 | 0.58 |
| 8 | 6 L + 0.5 S | 39 | 0.36 | 12 | 19 | −0.21 | 0.80 | 18 | 15 | 0.28 |
| 9 | 5 L + 1.5 S | 39 | 1.07 | 12 | 19 | −0.14 | 0.60 | 32 | 5 | 0.60 |
| 10 | 6 L + 1.5 S | 39 | 1.60 | 12 | 19 | −0.31 | 1.00 | 22 | 11 | 0.42 |
| 11 | 5 L + 2 K + 0.5 S | 39 | 2.49 | 32 | 5 | 2.17 | 1.00 | 25 | 10 | 0.88 |
| 12 | 6 L + 2 K + 0.5 S | 39 | 5.16 | 32 | 5 | 4.48 | 1.79 | 21 | 12 | 1.61 |
| 13 | 5 L + 2 K + 1.5 S | 39 | 3.20 | 32 | 5 | 3.06 | 1.39 | 18 | 15 | 1.36 |
| 14 | 6 L + 2 K + 1.5 S | 39 | 3.20 | 32 | 5 | 2.72 | 1.19 | 18 | 15 | 1.08 |
| 15 | 5 L + 3 K + 0.5 S | 39 | 8.36 | 32 | 5 | 8.05 | 3.19 | 32 | 5 | 3.19 |
| 16 | 6 L + 3 K + 0.5 S | 39 | 4.89 | 33 | 4 | 4.80 | 1.59 | 32 | 5 | 1.59 |
| 17 | 5 L + 3 K + 1.5 S | 39 | 2.40 | 32 | 5 | 1.94 | 0.79 | 22 | 11 | 0.69 |
| 18 | 6 L + 3 K + 1.5 S | 39 | 3.47 | 12 | 19 | 2.57 | 0.79 | 18 | 15 | 0.54 |
| 19 | 5 L + 4 K + 0.5 S | 39 | 0.89 | 13 | 18 | 0.53 | 0.60 | 21 | 12 | 0.20 |
| 20 | 6 L + 4 K + 0.5 S | 39 | 0.71 | 13 | 18 | 0.28 | 0.40 | 20 | 13 | −0.26 |
| 21 | 5 L + 4 K + 1.5 S | 39 | 0.53 | 12 | 19 | 0.28 | 0.00 | 0 | 27 | −0.42 |
| 22 | 6 L + 4 K + 1.5 S | 39 | 0.89 | 12 | 19 | 0.53 | 0.20 | 1 | 27 | −0.21 |

L = lime (number = % used in treatment, e.g., 6 L = 6% lime)
K = potassium hydroxide
S = silica compound, in this case amorphous silica The basic properties of the materials provided from the Denver Airport site indicate their potentially active behavior. Materials with plastic indexes of over 30 are considered highly active and would exhibit damaging shrink-swell characteristics, if not stabilized. The plastic index of the combined materials from this site becomes 16.6 when 6% hydrated lime is applied. It was found that this percent of lime was necessary to peak out the pH of the soil, maximize the reduction of its plastic index and to provide the maximum strength for stabilization. The amounts of so called soluble salts in these natural materials range from those which would not be of concern to those values which cause much concern. The mean values of 905 ppm for a 1 part soil to 1 part water extraction is well above what is now considered dangerous (500 ppm) and the mean value for the 1 part soil to 10 parts water extraction (2775 ppm) is clearly above the levels now considered dangerous, of 2000 ppm.

The results of the swell test done with natural soil from this site indicate the highly active nature of this material. Vertical swell of 9.96% and sustained average vertical swell of 9.35% are considered very significant and potentially very damaging. The horizontal swell of over 7.5% is of even more concern, as this means that a pavement system placed on these soils would likely fail by buckling. One can see that the amounts of vertical and horizontal swell which occurred when these materials were treated with single applications of lime are not as much as exhibited by the natural soil but are unacceptable. It is believed that the swell of these materials was caused by ettringite formation and hydration. Applications of lime in conjunction with silica proved to be effective in reducing or eliminating swell. The amounts of swell determined for these materials are well within acceptable limits for both horizontal and vertical swell.

While the exact mechanism of the invention is not completely understood, it has been determined that the calcium silicate hydrate formation acts as a catalyst for the formation of pozzolans in the system, thereby tying up the alumina released by the high pH environment and the calcium and hydroxyls furnished by the lime application. Potassium hydroxide (KOH) can also be added in order to enhance the rapid development of CAH by increasing the pH environment (greater than about 12.5), thereby causing the alumina and silica in the clay to be released more rapidly in the presence of lime and added silica, if necessary. The preferred addition rate for potassium hydroxide in the practice of the present method is about 4% by weight of one square yard of the soil being treated at design depth.

An invention has been provided with several advantages. Treatment of sulfate bearing soils in accordance with the method of the invention is successful in preventing unwanted swell or expansion and in increasing bearing strengths of the soils tested. Lime, added to the silica treated soils, reduces swell pressures in volume change tests, keeping the swell in the "non-critical" range. The present method reduces the risk that lime stabilized soils will revert to ettringite formation at a later date when new sources of water born sulfates again enter and attack the treated soil matrix. The silica compound used in the treatment method of the invention is relatively inexpensive, available, and does not greatly increase the cost of the soil stabilization treatment.

While the invention has been shown in only one of its forms, it is not thus limited but is susceptible to various changes and modifications without departing from the spirit thereof.

What is claimed is:

1. An improved method for reducing the swelling action of soluble sulfates present in clay bearing soils of the type having hydrates of alumina present therein, where such sulfates and hydrates of alumina tend to combine in a chemical reaction to form highly expansive, water sensitive minerals in the presence of lime and excess water, the method comprising the steps of:

incorporating into the soils both lime and a silica compound, the silica compound being present in an amount effective to chemically bond with free calcium provided by the lime and hydrates of alumina present in the clay bearing soils, thereby decreasing the tendency of the soils to form water sensitive and highly expansive minerals.

2. The method of claim 1, wherein the lime which is applied to the soils is provided in the form of calcium hydroxide.

3. The method of claim 1, wherein the lime which is applied to the soil is provided in the form of quicklime.

4. An improved method for reducing the swelling action of soluble sulfates present in clay bearing soils of the type having hydrates of alumina present therein, where such sulfates and hydrates of alumina tend to combine in a chemical reaction to form highly expansive ettringite crystals in the presence of lime and excess water and where such hydrates of alumina and silica found in the clay bearing soils normally produce calcium silica hydrates and calcium aluminum hydrates in the presence of lime and in the absence of excess water, the method comprising the steps of:

incorporating into the soils both lime and a silica compound, the silica compound being present in an amount effective to rapidly chemically bond with free calcium provided by the lime and hydroxyl groups furnished by hydrates of alumina present in the clay bearing soils to thereby rob the ettringite reaction of free calcium and hydroxyl groups needed to go to completion, thereby decreasing the potential of the soil to form ettringite.

5. The method of claim 4, wherein the silica compound and the lime are incorporated into the soils in a single step.

6. The method of claim 5, wherein the silica compound is selected from the group consisting of amorphous silica, crystalline silica, silica gel, sodium silicate, potassium silicate and combinations thereof.

7. The method of claim 6, wherein the lime which is applied to the soils is provided in the form of calcium hydroxide.

8. The method of claim 7, wherein the lime is provided in the form of calcium hydroxide and wherein the silica compound is combined with the calcium hydroxide to form a lime slurry, the slurry then being applied to the clay bearing soils in order to stabilize the clay bearing soils.

9. The method of claim 8, further comprising the step of adding potassium hydroxide to the clay bearing soils to increase the pH of the clay bearing soils above about 12.5 and cause the free alumina in the soils to be released more rapidly in the presence of lime and the silica compound.

* * * * *